(12) United States Patent
Funakoshi

(10) Patent No.: US 9,803,991 B2
(45) Date of Patent: Oct. 31, 2017

(54) ROUTE GUIDE DEVICE AND ROUTE GUIDE METHOD

(71) Applicant: HONDA MOTOR CO., LTD., Tokyo (JP)

(72) Inventor: Kotaro Funakoshi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/046,731

(22) Filed: Feb. 18, 2016

(65) Prior Publication Data

US 2016/0305792 A1    Oct. 20, 2016

(30) Foreign Application Priority Data

Apr. 16, 2015 (JP) ................................. 2015-084131

(51) Int. Cl.
*G01C 21/00* (2006.01)
*G01C 21/34* (2006.01)
*G01C 21/36* (2006.01)

(52) U.S. Cl.
CPC ..... *G01C 21/3484* (2013.01); *G01C 21/3676* (2013.01)

(58) Field of Classification Search
None
See application file for complete search history.

(56) References Cited

U.S. PATENT DOCUMENTS

| 7,130,743 B2 * | 10/2006 | Kudo | G01C 21/3617 340/995.14 |
| 7,512,487 B1 * | 3/2009 | Golding | G01C 21/36 701/424 |
| 2011/0087429 A1 * | 4/2011 | Trum | G01C 21/32 701/533 |

FOREIGN PATENT DOCUMENTS

| JP | 2003-075187 A | 3/2003 |
| JP | 2006-010495 A | 1/2006 |
| JP | 2006-229744 A | 8/2006 |
| JP | 2008-215861 A | 9/2008 |
| JP | 2012-251865 | 12/2012 |
| WO | 2005/038404 A1 | 4/2005 |

OTHER PUBLICATIONS

Japanese Office Action with English Translation dated Nov. 1, 2016, 9 pages.

\* cited by examiner

*Primary Examiner* — James M McPherson
(74) *Attorney, Agent, or Firm* — Rankin, Hill & Clark LLP

(57) ABSTRACT

A route guide device includes a current position acquisition unit that acquires a current position, an input unit that inputs a destination, a route search unit that searches for a route from the current position to the destination, a level storage unit that stores a of user's learning level of road information, a route overview generation unit that generates entire route information for the entire route on the basis of the route found through the search and the learning level stored in the level storage unit, and a notification unit that notifies of the entire route information generated by the route overview generation unit.

6 Claims, 11 Drawing Sheets

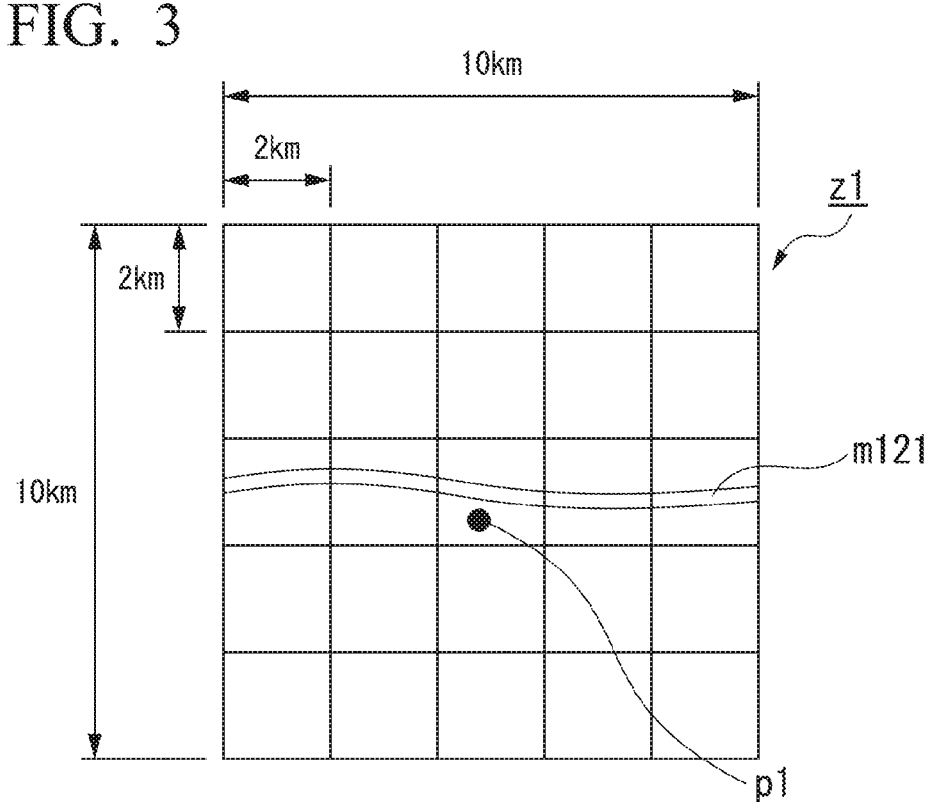

FIG. 7

| LEVEL | RELATIVE PROPERTIES | GEOGRAPHIC PROPERTIES | ROAD TYPE 1 | ROAD TYPE 2 | PASSAGE REGION 1 | PASSAGE REGION 2 | PASSAGE REGION 3 | PASSAGE REGION 4 | TRAFFIC CHARACTER -ISTIC |
|---|---|---|---|---|---|---|---|---|---|
| Lv0 | ○ | ○ | ○ | | | | | | |
| Lv1 | ○ | ○ | ○ | | ○ | | | | ○ |
| Lv2 | ○ | | | ○ | | ○ | | ○ | ○ |
| Lv3 | ○ | | | ○ | | ○ | ○ | ○ | |

FIG. 8

| TYPE | DESCRIPTION |
|---|---|
| RELATIVE PROPERTIES | "FASTEST," "CHEAPEST," … |
| GEOGRAPHIC PROPERTIES | "ALONG GULF," "ALONG ARAKAWA RIVER," … |
| ROAD TYPE 1 | "PASSES THROUGH HIGHWAY," "PASSES THROUGH GENERAL ROAD," … |
| ROAD TYPE 2 | "PASSES THROUGH SHUTO EXPRESSWAY NO. 1," "PASSES THROUGH NATIONAL ROUTE 16," … |
| PASSAGE REGION 1 | PREFECTURE: "PASSES THROUGH YAMANASHI PREFECTURE AND NAGANO PREFECTURE" … |
| PASSAGE REGION 2 | CITY AND WARD: "PASSES THROUGH TAKAYAMA AND FUJI," … |
| PASSAGE REGION 3 | STREET AND TOWN: "PASSES THROUGH KASAI AND ICHINOE," … |
| PASSAGE REGION 4 | LANDMARK: "PASSES IN FRONT OF SHOPPING CENTER A" |
| TRAFFIC CHARACTERISTICS | "PASSES THROUGH AN ARTERIAL ROAD," "PASSES THROUGH AN URBAN AREA," "PASSES THROUGH A SUBURB," … |

FIG. 11

```
┌─────────────────────────────────────────────────────────────┐
│  THIS IS THE FIRST ROUTE.  THIS A ROUTE HAS THE SHORTEST    │
│  TRAVELING DISTANCE.  THIS ROUTE PASSES THROUGH THE GAIKAN  │
│  EXPRESSWAY, THE KAN-ETSU EXPRESSWAY, THE KEN-O EXPRESSWAY, │
│                    AND THE CHUO EXPRESSWAY.                 │ — o11
│  THIS ROUTE EXTENDS NORTH FROM NERIMA TO TSURUMI, SOUTHWEST │
│     FROM TSURUMI TO HACHIOJI, WEST FROM HACHIOJI TO OTSUKI, │
│        AND SOUTHWEST FROM OTSUKI TO LAKE KAWAGUCHI.         │
└─────────────────────────────────────────────────────────────┘

┌─────────────────────────────────────────────────────────────┐
    │ THIS IS THE SECOND ROUTE.  THIS ROUTE IS THE CHEAPEST.      │
    │    THE ROUTE PASSES THROUGH BELTWAY 8, KOSHU KAIDO,         │
    │                       AND FUJI MICHI.                       │
    │ THIS ROUTE EXTENDS SOUTH FROM WAKO TO SHINJUKU, WEST        │ — o12
    │   FROM SHINJUKU TO OTSUKI, AND SOUTHWEST FROM OTSUKI        │
    │                    TO LAKE KAWAGUCHI.                       │
    └─────────────────────────────────────────────────────────────┘
``` k11

```
┌─────────────────────────────────────────────────────────────────┐
│ (RELATIVE PROPERTIES) THIS ROUTE HAS THE SHORTEST TRAVELING DISTANCE. │
│ (ROAD TYPE 2)                                                   │
│ THIS ROUTE PASSES THROUGH THE GAIKAN EXPRESSWAY, THE KAN-ETSU   │
│ EXPRESSWAY, THE KEN-O EXPRESSWAY, AND THE CHUO EXPRESSWAY.      │
│ (PASSAGE REGION 2)                                              │
│ THIS ROUTE EXTENDS NORTH FROM NERIMA TO TSURUMI, SOUTHWEST FROM │
│ TSURUMI TO HACHIOJI, WEST FROM HACHIOJI TO OTSUKI, AND SOUTHWEST│
│ FROM OTSUKI TO LAKE KAWAGUCHI.                                  │
└─────────────────────────────────────────────────────────────────┘

┌─────────────────────────────────────────────────────────────┐
   │ (RELATIVE PROPERTIES) THIS ROUTE IS THE CHEAPEST.           │
   │ (ROAD TYPE 2) THIS ROUTE PASSES THROUGH BELTWAY 8, KOSHU    │ — k12
   │ KAIDO, AND FUJI MICHI                                       │
   │ (PASSAGE REGION 2) THIS ROUTE EXTENDS SOUTH FROM WAKO       │
   │ TO SHINJUKU, WEST FROM SHINJUKU TO OTSUKI, AND SOUTHWEST    │
   │ FROM OTSUKI TO LAKE KAWAGUCHI.                              │
   └─────────────────────────────────────────────────────────────┘
```

ROUTE GUIDE DEVICE AND ROUTE GUIDE METHOD

CROSS-REFERENCE TO RELATED APPLICATION

Priority is claimed on Japanese Patent Application No. 2015-084131, filed Apr. 16, 2015, the content of which is incorporated herein by reference.

BACKGROUND OF THE INVENTION

Field of the Invention

The present invention relates to a route guide device and a route guide method.

Description of Related Art

A navigation device that shows a current position and a route to a destination during travel in a vehicle has been put to practical use. Such a navigation device searches for a route from a current position which is a departure position to a destination, and displays a result of the search on a map image displayed on a display unit included in the route guide device. The navigation device shows a travel direction or the like using an image and sound during travel in the vehicle.

Performing route guide in such a navigation device according to a history of route elements that a user has passed in a vehicle in the past is disclosed. The route elements are roads divided at intersections (see, for example, Japanese Unexamined Patent Application, First Publication No. 2012-251865 (hereinafter, Patent Document 1)).

SUMMARY OF THE INVENTION

However, in the technology described in Patent Document 1, an overview of an entire route from the departure position to the destination is not shown according to the user's learning level of the route.

An aspect according to the present invention has been made in view of the above points, and an object of the present invention is to provide a route guide device and a route guide method capable of showing an overview of an entire route from a departure position to a destination according to a user's learning level of the route.

To achieve the above object, the present invention adopts the following aspects.

(1) A route guide device according to an aspect of the present invention includes a current position acquisition unit that acquires a current position; an input unit that inputs a destination; a route search unit that searches for a route from the current position to the destination; a level storage unit that stores a user's learning level of road information; a route overview generation unit that generates entire route information for the entire route on the basis of the route found through the search and the learning level stored in the level storage unit; and a notification unit that notifies of the entire route information generated by the route overview generation unit.

(2) In the aspect of (1), the notification unit may notify of the entire route information when a vehicle starts traveling.

(3) In the aspect of (1) or (2), the learning level may be acquired on the basis of a travel history of the vehicle.

(4) In the aspect of any one of (1) to (3), the entire route information may be generated using a matrix in which information on roads included in the route is associated with learning levels.

(5) In the aspect of (4), the information on the roads included in the route may be at least one of information on characteristics of the route, information on characteristics of the roads in the route, information on a region through which the route passes, and information on a landmark along the route.

(6) In the aspect of (5), the route overview generation unit may extract information from the information on the characteristics of the route, the information on the characteristics of the roads in the route, the information on the region through which the route passes, and the information on the landmark along the route, according to the learning level.

(7) In the aspect of (5) or (6), the route overview generation unit may extract information from the information on the characteristics of the route, the information on the characteristics of the roads in the route, the information on the region through which the route passes, and the information on the landmark along the route, according to a distance of the route.

(8) In the aspect of any one of (1) to (7), the route overview generation unit may generate the entire route information on a plurality of routes, the notification unit may notify of the entire route information on the plurality of routes, and there may be further provided with the route selection unit configured to acquire a selection instruction indicating the entire route information selected by the user from among the entire route information on the plurality of routes notified of by the notification unit.

(9) In the aspect of any one of (1), (2), and (4) to (8), the learning level may be input by the user.

(10) A route guide method according to an aspect of the present invention includes: acquiring a current position; inputting a destination; searching for a route from the current position to the destination; storing a user's learning level of road information; generating entire route information for the entire route on the basis of the searched route and the stored learning level; and notifying of the entire route information.

According to the above-described aspects of (1), (9), and (10), the overview of the entire route from the departure position to the destination can be shown according to the user's learning level of the route. As a result, the user can picture the route to the destination position by listening to a voice signal according to the user's learning level of the route on the basis of the overview of the entire route shown at the beginning of travel.

In the case of above-described (2), before the route is searched for and the navigation is started, the user can picture the route by listening to the voice signal corresponding to the learning level of the route.

In the case of above-described (3), since the learning level is determined on the basis of the travel history acquired in the background during travel of the vehicle, the overview of the entire route can be shown according to the user's latest learning level of the route.

In the case of above-described (4) to (6), since the entire route information can be appropriately generated using the information on the roads included in the route according to the learning level, it is possible to show the entire route information at a learning level that will be easily understood by the user. In the case of above-described (7), it is possible to provide an overview of the route according to the distance of the route. As a result, the user can recognize a width of the route based on the notified entire route information. The width of the route is a width within an area that the user visits on a daily basis, a width beyond the area that the user visits on a daily basis, or the like.

In the case of above-described (8), even when a plurality of routes are presented, it is possible to assist the user in selecting a travel route based on the notified overview of the entire route.

BRIEF DESCRIPTION OF THE DRAWINGS

FIG. 3 is a diagram illustrating a concept of an area used to determine a learning level according to this embodiment.

FIG. 4 is a diagram illustrating a relationship between the learning level and a radius of a circle according to this embodiment.

FIG. 7 is a diagram illustrating an example of a relationship between a learning level and aspects according to this embodiment.

FIG. 8 is a diagram illustrating examples of aspects according to this embodiment.

FIG. 11 is a diagram illustrating an example of the route overview information when the learning level is Lv3 according to this embodiment.

DETAILED DESCRIPTION OF THE INVENTION

First, an overview of the present invention will be described.

A route guide device of this embodiment is, for example, a navigation device which is used in a vehicle. The route guide device of this embodiment searches for a route from a current position to a destination, and notifies of an overview of the entire route found through the search by voice when travel in the vehicle starts according to a user's learning level of the route. Further, when a plurality of routes are searched for at the beginning of travel, the route guide device of this embodiment notifies of each route by voice according to the user's learning level of the route.

Hereinafter, embodiments of the present invention will be described with reference to the accompanying drawings.

Figure 1:
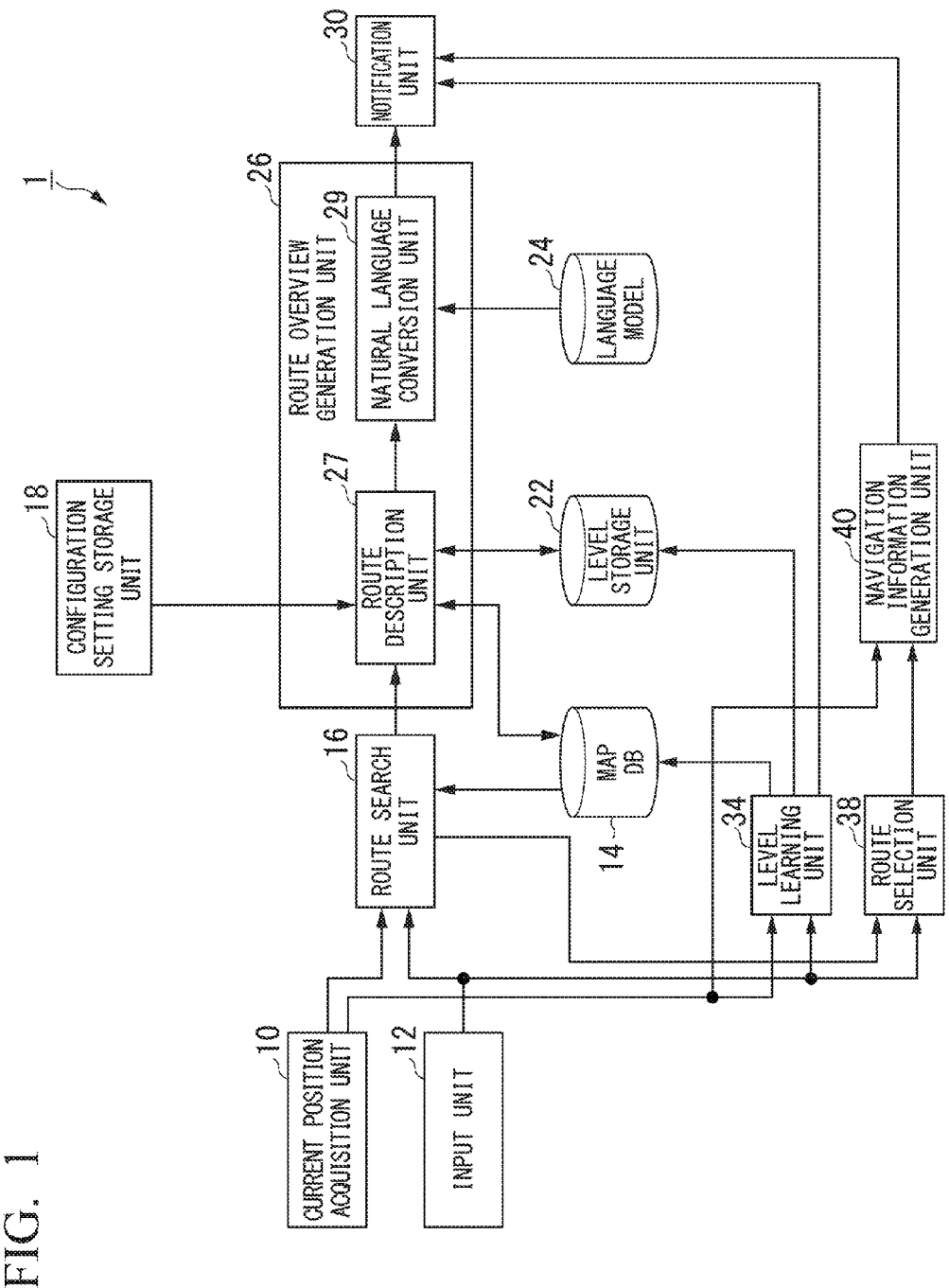
FIG. 1 is a block diagram illustrating a configuration of a route guide device according to this embodiment.

FIG. 1 is a block diagram illustrating a configuration of a route guide device 1 according to this embodiment. In this embodiment, an example in which the route guide device 1 is a navigation device will be described, but the present invention is not limited thereto. The route guide device 1 may be a smart phone, a tablet computer, a portable game device, or the like.

As illustrated in FIG. 1, the route guide device 1 includes a current position acquisition unit 10, an input unit 12, a map DB 14, a route search unit 16, a configuration setting storage unit 18, a level storage unit 22, a language model 24, a route overview generation unit 26, a notification unit 30, a level learning unit 34, a route selection unit 38, and a navigation information generation unit 40. Further, the route overview generation unit 26 includes a route description unit 27 and a natural language conversion unit 29.

The current position acquisition unit 10 is the Global Positioning System (GPS), and acquires current position information indicating a current position, and outputs the acquired current position information of a departure position to the route search unit 16.

For example, information on latitude and longitude is included in the current position information. Further, the current position acquisition unit 10 may acquire the current position information from a base station or the like for a portable terminal. The current position acquired by the current position acquisition unit 10 is a departure position or a point on a route from the departure position to the destination. Further, the current position acquisition unit 10 outputs the current position information of the point on the route from the departure position to the destination to the level learning unit 34 and the navigation information generation unit 40.

The input unit 12 acquires a destination from an utterance of the user through voice recognition, and outputs destination information indicating the acquired destination to the route search unit 16. The destination information is a destination name, and may include, for example, the names of the prefecture and municipality in which the destination is located. Further, the input unit 12 may be an input unit such as a touch panel. Further, for example, when the user operates a smart phone (not illustrated) and performs an input and the input destination information is transmitted from the smart phone, the input unit 12 may receive and acquire the transmitted destination information.

Further, the input unit 12 acquires a learning level from an utterance of the user through voice recognition, and outputs the acquired learning level to the level learning unit 34. When the notification unit 30 includes a touch panel type input unit, the input unit may be an input unit 12.

Further, when the route is selected, the input unit 12 outputs the voice of the user recognized through the voice recognition from the utterance of the user to the route selection unit 38.

The map DB 14 is a database in which map information is stored. Information on a landmark such as a station or a commercial facility, information on roads, information on intersections, and the like are included in the map information. Further, a position (latitude and longitude) of each point and information on the point are stored in the map DB 14. Here, the point is a predetermined point on the map, a landmark, a point used in learning of a learning level to be described below, an intersection, a point at which there is a station, or the like. Further, the information on the point is a distance from one point to a next point (for example, a next intersection, a next junction, or a next service area) connected in a road, a name of a prefecture and a name of a municipality in which the point is located, peripheral information of a road including the point, or the like. The peripheral information on a road including the point is information indicating that the road follows a river, information indicating that the road is along a sea, information indicating that the road passes through a mountain, information indicating that the road is a general road, information indicating that the road is a highway, information indicating that the road is an arterial road, information indicating that the road is in an urban area, and information indicating that the road is in a suburb.

The current position information output by the current position acquisition unit 10 and the destination information output by the destination information input unit 12 are input to the route search unit 16. The route search unit 16 searches for a route from the current position to the destination according to a known scheme using the map information stored in the map DB 14. The route search unit 16 may search for a plurality of routes from the current position to the destination.

The route search unit 16 outputs route information indicating the route found through the search as a route model to the route overview generation unit 26 and the route selection unit 38. A plurality of points on the road and information on the points are included in the route model. Further, information for identifying a plurality of routes when the plurality of routes are searched for is included in the route model.

Settings for an aspect determination unit (FIG. 8) and a filter (FIG. 8) included in the route description unit 27 are stored in the configuration setting storage unit 18. For example, when the route guide device 1 is powered on, setting information stored in the configuration setting storage unit 18 is loaded into the route description unit 27.

The user's learning level is stored in the level storage unit 22 at each point. The points are sequentially added, for example, according to the travel of the vehicle. The learning level is updated at each point according to the travel of the vehicle. When there are a plurality of users, each user's learning level may be stored in the user model at each point.

A model formulated for parts of speech or syntactic structures within a sentence, and relationships between words and between sentences is stored in the language model 24.

A route model is input from the route search unit 16 to the route description unit 27. The route description unit 27 determines a learning level of the route using the learning level stored in the level storage unit 22 at each point. The route description unit 27 generates information (hereinafter referred to as entire route information) on an entire route from the departure position to the destination using the route model and the determined learning level. The route description unit 27 outputs the generated entire route information to the natural language conversion unit 29. A configuration of the route description unit 27 and a method of generating the entire route information will be described below. Further, when a plurality of routes are searched for, information for identifying the routes is included in the entire route information.

The natural language conversion unit 29 converts the entire route information output by the route description unit 27 into natural language by referring to the language model 24, and outputs the converted natural language as route overview information to the notification unit 30. The route overview information is text information. Further, the route overview information may be an audio signal obtained by converting the text to voice. Further, when a plurality of routes are searched for, information for identifying the routes is included in the route overview information.

The notification unit 30 includes a conversion unit that converts the entire route information output by the natural language conversion unit 29 into an audio signal and a speaker that outputs voice. The notification unit 30 converts the route overview information into an audio signal and outputs the converted audio signal. Further, the notification unit 30 converts the navigation information output by the navigation information generation unit 40 into an audio signal and outputs the converted audio signal. The notification unit 30 may include a display unit, and a touch panel type input unit on the display unit.

The level learning unit 34 acquires the current position information output by the current position acquisition unit 10 when the vehicle is traveling and stopped. The level learning unit 34 sequentially stores in the user model, for example, the current position information in association with the learning level output by the input unit 12 and performs learning of the user model.

The level learning unit 34 may generate, for example, a sentence asking by voice whether or not the user knows a landmark or the like by referring to the map DB 14, and output the generated sentence to the notification unit 30. The level learning unit 34 may learn the learning level at the point at which there is a landmark according to the user's answer to the question acquired by the input unit 12.

When the notification unit 30 notifies of an overview of the plurality of routes, the route selection unit 38 extracts voice indicating which route is selected from the voice output by the input unit 12 using a known scheme. The route selection unit 38 outputs information on the route selected from among the routes output by the route search unit 16 on the basis of the voice indicating the extracted route to the navigation information generation unit 40.

The navigation information generation unit 40 generates navigation information according to a known scheme using the information on the route output by the route selection unit 38 and the current position information output by the current position acquisition unit 10, and outputs the generated navigation information to the notification unit 30.

<Example of Route From Departure Position to Destination>

Next, an example of a route from the current position to the departure position will be described.

Figure 2:
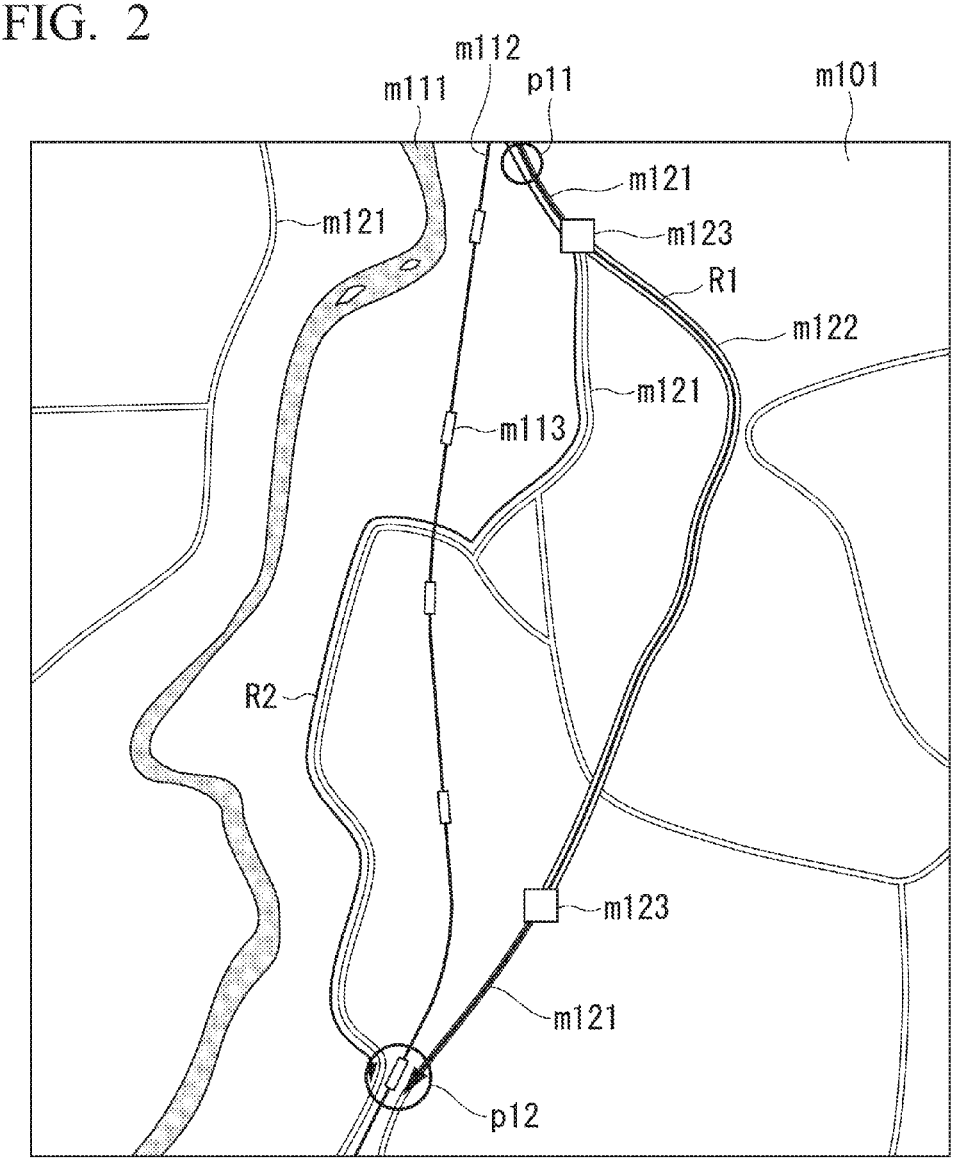
FIG. 2 is a diagram illustrating an example of a route from a departure position to a destination according to this embodiment.

FIG. 2 is a diagram illustrating an example of a route from a departure position to a destination according to this embodiment.

In FIG. 2, a map m101 is an image of a map including a departure position p11 and a destination p12. A reference sign m111 indicates a river, a reference sign m112 indicates a railroad, and a reference sign m113 indicates a station. Further, a reference sign m121 indicates general roads, a reference sign m122 indicates a highway, and a reference sign m123 indicates entrances and exits of the highway.

The example illustrated in FIG. 2 is an example in which a first route R1 and a second route R2 are searched for as routes from the departure position p11 to the destination p12. The first route R1 is a route through the highway m122. The second route R2 is a route through only the general roads m121. Further, the second route R2 crosses the railroad m112.

In this embodiment, an overview of such an entire route is notified of by the notification unit 30 by voice according to the user's learning level of the route using the information included in the route.

<Description of the Learning Level>

Next, the user's learning level in this embodiment will be described. In this embodiment, an example in which the learning level is divided into six steps will be described. The number of learning levels is not limited thereto, and may be fewer than six or may be seven or more.

Lv0: The user knows no regional names (for example, a level applicable when the user has gone for the first time to a place with a name that the user has never heard)

Lv1: The user knows famous cities or regional names (for example, a level at which the user knows Tokyo, Yokohama, or Shinjuku).

Lv2: The user knows city names, regional names, station names, and primary roads around the user to some extent (for example, a level applicable in a metropolitan area that the user has traveled to before such as Kichijoji, Meguro, or Odaiba).

Lv3: The user knows local geography at a street name level to some extent (for example, a level applicable when the user has lived in that region; or when the user is living in that region but is unfamiliar with the roads).

Lv4: The user has considerable knowledge of local geography at a street name level (for example, a level applicable when the user is living in and has explored that region).

Lv5: The user generally recognizes street names and numbers (for example, the level of a taxi driver or a driver of a courier delivery vehicle).

The above-described learning levels are not necessarily assigned to users in one-to-one correspondence. For example, even when the user is at Lv3 for Yokohama, if the user has not gone to Tsu in Yamaguchi Prefecture, the learning level for Tsu may be Lv1. That is, the learning level depends on an area (region) even for the same user.

FIG. 3 is a diagram illustrating a concept of an area used to determine the learning level according to this embodiment. An example illustrated in FIG. 3 is an example in which an area z1 of 10 km$^2$ is divided into areas of 2 km$^2$ in a mesh. For example, a map is divided as illustrated in FIG. 3. In FIG. 3, a reference numeral m121 indicates a general road, similar to that in FIG. 2. Further, a point p1 indicates a center of the area z1.

For example, when a vehicle (not illustrated) has passed through only the general road m121, a user is assumed to know the general road m121 but not be familiar with roads around the general road, and accordingly, the level learning unit 34 sets the learning level for the point p1 to Lv2.

On the other hand, when the vehicle has passed through each mesh around the general road m121, the user is assumed to be familiar with information on all roads in the area z1, and accordingly, the level learning unit 34 sets the learning level for the point p1 to Lv3.

Sizes of the area z1 and the meshes illustrated in FIG. 3 are examples, and are not limited thereto.

<Concentric Approximation Model>

Next, a concentric approximation model used in this embodiment will be described with reference to FIGS. 4 to 6.

FIG. 4 is a diagram illustrating a relationship between the learning level and a radius of a circle according to this embodiment. FIGS. 5 and 6 are diagrams illustrating an example of a concentric approximation model according to this embodiment.

As illustrated in FIG. 4, outside a radius of 500 km is associated with Lv0, within a radius of 500 km is associated with Lv1, and within a radius of 50 km is associated with Lv2. Within a radius of 10 km is associated with Lv3, within a radius of 2 km is associated with Lv4, and within a radius of 500 m is associated with Lv5. The radii illustrated in FIG. 4 are examples, are not limited thereto, and may have other values. Further, a value of the radius may be different, for example, for each region.

Figure 5:
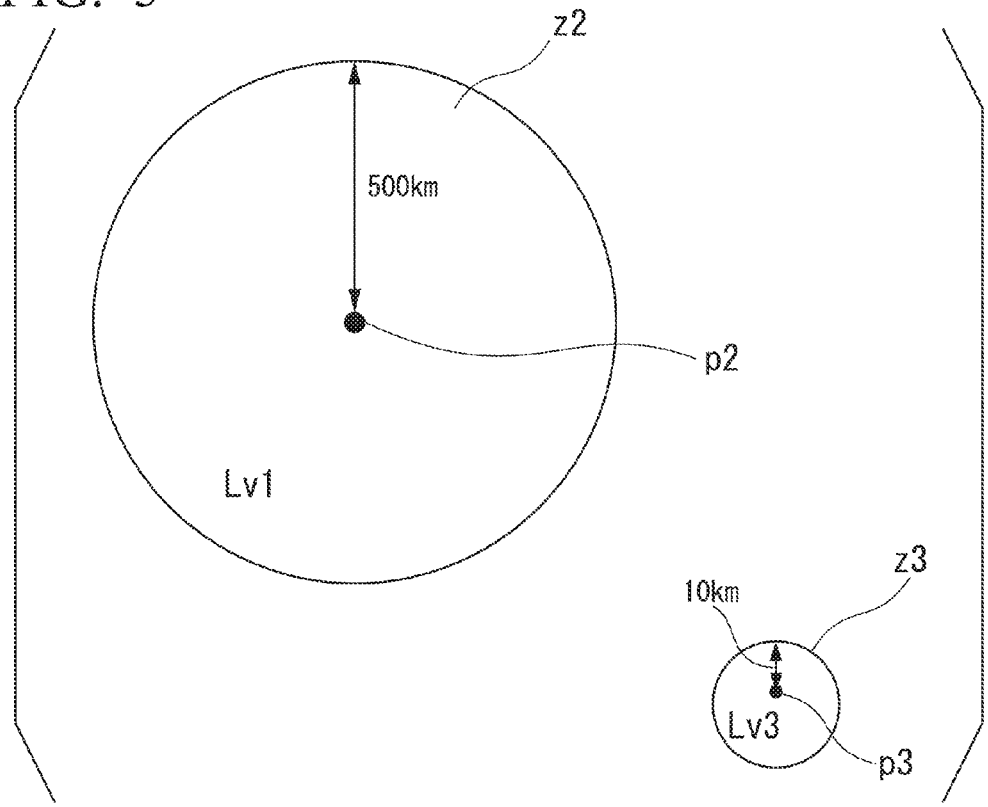
FIG. 5 is a diagram illustrating an example of a concentric circle approximation model according to this embodiment.

An example illustrated in FIG. 5 is an example in which a learning level for a region around a point p2 is Lv1, and a learning level for a region around a point p3 is Lv3. As illustrated in FIG. 5, a learning level in a range z2 within a radius of 500 km from the point p2 is Lv1. A learning level in a range z3 within a radius of 10 km from the point p3 is Lv3.

Figure 6:
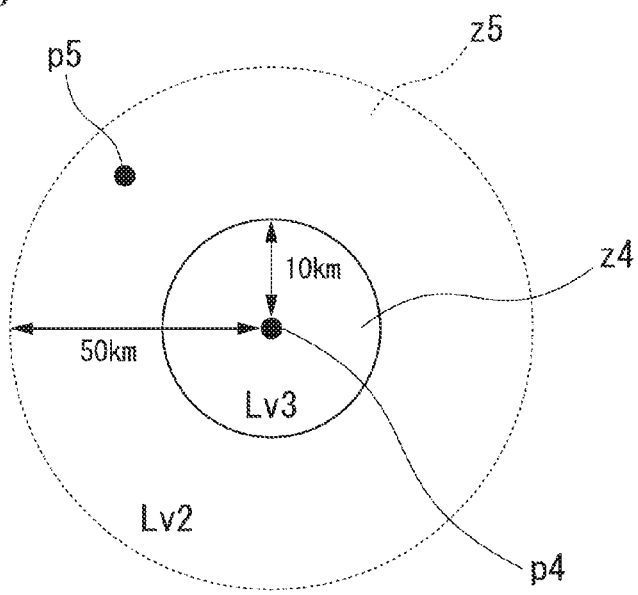
FIG. 6 is a diagram illustrating an example of a concentric circle approximation model according to this embodiment.

An example illustrated in FIG. 6 is an example in which a learning level for a region around a point p4 is Lv3, and the learning level is not learned at a point p5 between a 10 km radius and a 50 km radius from the point p4. As illustrated in FIG. 6, even when the learning level of the point p5 is not learned, the route description unit 27 estimates the learning level of the point p5 to be Lv2 since the point p5 is within 50 km from the point p4, on the basis of the information stored in the level storage unit 22 on the basis of the learning level of the point p4 at which the learning level has already been learned.

Such a concentric approximation model is stored for each predetermined point through which the vehicle of the user passes in the level storage unit 22. Here, the predetermined point may be, for example, an intersection point, or may be a center of the predetermined area z1 as illustrated in FIG. 3, a point at which there is a landmark, or the like. The learning level of a point through which the vehicle of the user has never passed is set to Lv0 or Lv1 as an initial value.

While the example in which the concentric approximation model is used has been described in this embodiment, a model to be used may be any one indicating the learning level, and may be a model based on another shape or another model.

<Relationship Between Learning Level and Aspects>

Next, a relationship between the learning level and aspects will be described.

FIG. 7 is a diagram illustrating an example of a relationship between the learning level and aspects according to this embodiment.

In the example illustrated in FIG. 7, a relationship between Lv0 to Lv3 among the above-described learning levels and the aspects is shown. Here, the aspects are information used to generate the entire route information, and include relative properties, geographic properties, road type 1, road type 2, passage region 1, passage region 2, passage region 3, passage region 4, and traffic characteristics.

In the example illustrated in FIG. 7, the level Lv0 is associated with the aspects of relative properties, geographic properties, and road type 1. The level Lv1 is associated with the aspects of relative properties, geographic properties, road type 1, passage region 1, and traffic characteristics. The level Lv2 is associated with the aspects of relative properties, road type 2, passage region 2, passage region 4, and traffic characteristics. The level Lv3 is associated with the aspects of relative properties, road type 2, passage region 2, passage region 3, and passage region 4.

Thus, the correspondence between the learning level and the aspects is loaded from the configuration setting storage unit 18 to the route description unit 27 when the route guide device 1 is powered on as described above. A matrix of the relationship between the learning level and the aspects may be stored in the route description unit 27 in advance.

Further, the aspects illustrated in FIG. 7 are examples and are not limited thereto. The aspects may be, for example, information indicating that a route that crosses a railroad is included, information indicating that a route that crosses a river is included, information indicating that an elevated highway is included in the route, or the like.

Next, example of the aspects will be described.

FIG. 8 is a diagram illustrating examples of the aspects according to this embodiment. In the example illustrated in FIG. 8, the same aspects of FIG. 7 are shown.

The relative properties are descriptions of a cost of a route. The relative properties include, for example, "fastest" and "cheapest."

The geographic properties are descriptions of geographic properties of a road included in the route. The geographic properties include, for example, that the road is located along a gulf Such information on a road is included in the route model output by the route search unit 16 as described above.

Road type 1 is a description of a type of road included in the route. Road type 1 is a description indicating whether a highway is included in the route or whether only general roads are included and is included in the route model.

Road type 2 is a description of a road name included in the route and is included in the route model.

Passage region 1 is a name of a prefecture included in the route and is included in the route model.

Passage region 2 is a city name, a ward name, or the like included in the route and is included in the route model.

Passage region 3 is a street name, a town name, a village name or the like included in the route and is included in the route model.

Passage region 4 is a landmark name along the route and is included in the route model.

The traffic characteristics are description of ease of driving, and are included in the route model.

As illustrated in FIG. 8, each aspect is described as a description using a name of a position through which the route passes, such as "passes through Fuji." Such a description may be included in the route model or may be generated by the route description unit 27 using the name of the position through which the route passes.

Further, the aspects illustrated in FIG. 8 may not all be described for each point described above, and at least one of the aspects may be described.

<Route Description Unit 27>

Next, a configuration example of the route description unit 27 will be described.

Figure 9:
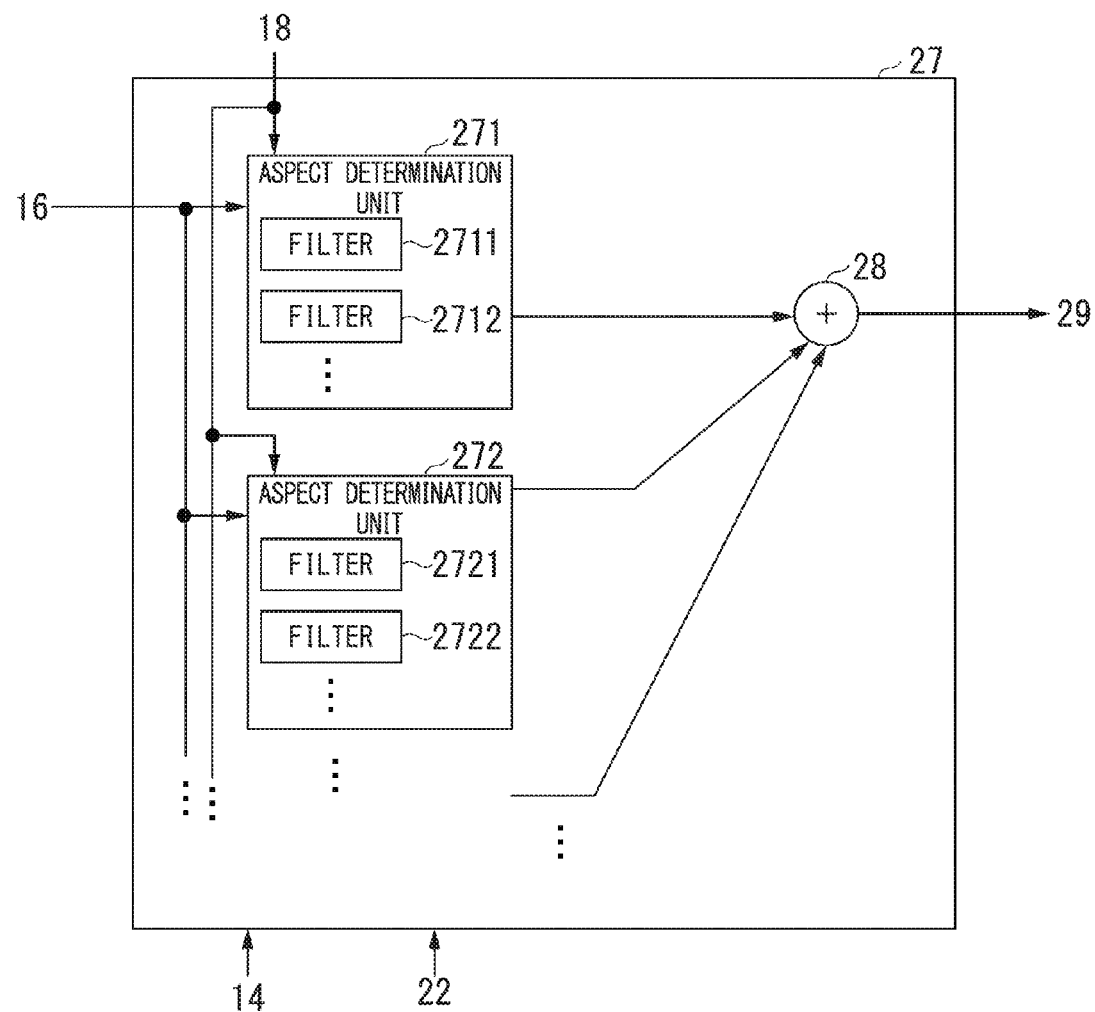
FIG. 9 is a block diagram of a schematic configuration of a route description unit according to this embodiment.

FIG. 9 is a block diagram of a schematic configuration of the route description unit 27 according to this embodiment. As illustrated in FIG. 9, the route description unit 27 includes aspect determination units 271, 272, . . . , and an addition unit 28. When no specific aspect determination unit 271, 272, . . . , is specified, the aspect determination units are referred to as an aspect determination unit 27n (n is an integer equal to or greater than 1).

The route description unit 27 includes aspect determination units 271 corresponding to the number of aspects described above. For example, the aspect determination unit 271 determines the aspect of relative properties, and the aspect determination unit 272 determines the aspect of geographic properties.

Each aspect determination unit 27n determines a description of the aspect according to a predetermined condition. This condition is performed by a filter included in each aspect determination unit 27n.

The aspect determination unit 271 includes filters 2711, 2712, . . . , and the aspect determination unit 272 includes filters 2721, 2722, . . . . The number of filters included in each aspect determination unit 27n may be different. Each aspect determination unit 27n outputs the description of the aspect selected by the filter included in the aspect determination unit 27n to the addition unit 28.

Here, examples of the roles of the filter will be described.

Example 1: The filter preferentially selects long roads and deletes short roads from the route model.

Example 2: The filter preferentially extracts points close to the departure position from the route model.

Example 3: When a highway is included in the route, the filter preferentially selects names of the entrances and exits and deletes, for example, place names therebetween from the route model.

The examples of the above-described filters are merely examples and are not limited thereto. The filter may be any filters depending on the aspects. Setting for such a filter is loaded from the configuration setting storage unit 18 to each respective filter when the route guide device 1 is powered on. Further, a method of combining a plurality of filters is included in the loaded configuration setting. The number of keywords extracted by the filter, a length of a sentence to be extracted, and the number of sentences may depend on the user's learning level. Further, the setting of the filter may depend on a length of the distance from the departure position to the destination.

Further, the setting of the filter may depend on the sex and the age of the user, preference for a shop, or the like. In this case, the route guide device 1 may store, for example, information acquired by asking the user questions by voice regarding the sex and age of the user, the preference for the shop, or the like during traveling and performing voice recognition on answers to the questions asked by voice, in the level storage unit 22, and update the information. Further, when the notification unit 30 includes a touch panel, the user may operate the touch panel to input sex, age, and preference for a shop.

The route description unit 27 selects the aspect determination unit 27n to be used from among the aspect determination units 271, 272, . . . according to the user's learning level. Accordingly, the route description unit 27 determines the aspects according to the user's learning level.

For example, the aspect determination unit 271 extracts the aspect of relative properties from the input route model to generate a description of the aspect. Specifically, the aspect determination unit 271 extracts the relative properties using the filters 2711, 2712, . . . As a result, the description of the "route with the shortest traveling distance" is output from the aspect determination unit 272.

For example, the aspect determination unit 272 extracts the aspect of geographic properties from the input route model to generate the description of the aspect. Specifically, the aspect determination unit 272 extracts the geographic characteristics using the filters 2721, 2722, . . . As a result, the description "passes through general roads" is output from the aspect determination unit 272.

The user's learning level is stored for each point in the level storage unit 22, as described above. The route description unit 27 determines the learning level in the entire route, for example, using the learning level associated with each point or points around each point in the route from the departure position to the destination.

For the learning level of the entire route, for example, one of a minimum value, a maximum value, a median value, and an average value of the learning level of the route is used. In this case, any one value to be used among the minimum value, the maximum value, the median value, and the average value of the learning level of the route is determined according to sex, age, cultural background, or the like. Therefore, in this embodiment, any one value to be used among the minimum value, the maximum value, the median value, and the average value of the learning level of the route may be preset according to a user assumed based on examination or may be selected by the user.

The addition unit 28 combines the descriptions of each aspect output from the plurality of aspect determination units 271, 272, ..., and outputs the combined description as the entire route information to the natural language conversion unit 29. The entire route information added by the addition unit 28 is combined, for example, in an order of relative properties, geographic properties, road type 1, road type 2, passage region 1, passage region 2, passage region 3, passage region 4, and traffic characteristics.

<Examples of Entire Route Information and Route Overview Information>

Next, examples of the entire route information and the route overview information will be described with reference to FIGS. 10 and 11.

Figure 10:
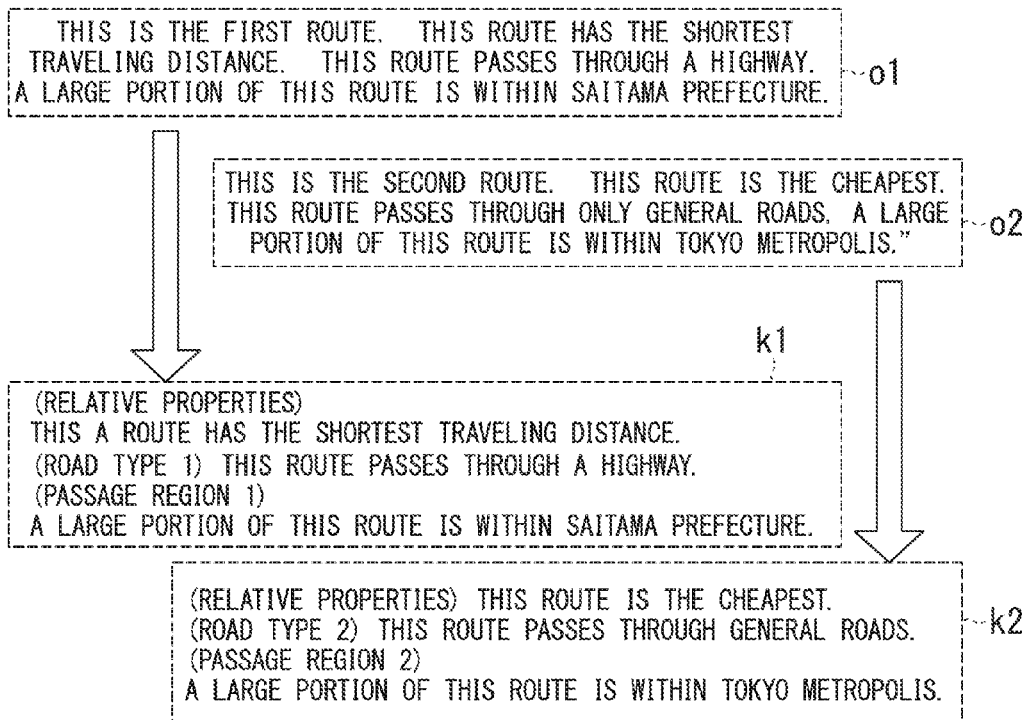
FIG. 10 is a diagram illustrating an example of the route overview information when the learning level is Lv1 according to this embodiment.

FIG. 10 is a diagram illustrating an example of the route overview information when the learning level is Lv1 according to this embodiment. FIG. 11 is a diagram illustrating an example of the route overview information when the learning level is Lv3 according to this embodiment. The examples illustrated in FIGS. 10 and 11 are examples in which the departure position is Wako, Saitama Prefecture, and the destination is Lake Kawaguchi in Minamitsuru District, Yamanashi Prefecture. Further, the examples illustrated in FIGS. 10 and 11 show two routes among results of route search. As described above, the route overview information is a sentence obtained by converting the entire route information into natural language, and accordingly, is information based on the route overview information.

In FIG. 10, an area indicated by a dashed line box of is an example of the route overview information for a first route, and is text indicating "This is the first route. This route has the shortest traveling distance. This route passes through a highway. A large portion of this route is within Saitama Prefecture." An area indicated by a dashed line box o2 is an example of route overview information for a second route, and is text indicating "This is the second route. This route is the cheapest. This route passes through only general roads. A large portion of this route is within Tokyo Metropolis."

When the learning level is Lv1, relative properties, geographic properties, road type 1, and passage region 1 are used as the aspects, as described with reference to FIG. 7.

In the route overview information for the first route, "This route has the shortest traveling distance" is a relative property, "This route passes through a highway" is road type 1, and "A large portion of this route is within Saitama Prefecture" is passage region 1, as indicated by a dashed line box k1.

In the route overview information for the second route, "This route is the cheapest" is a relative property, "This route passes through only general roads" is road type 2, and "A large portion of this route is within Tokyo Metropolis" is passage region 2, as indicated by a dashed line box k2.

In FIG. 11, an area indicated by a dashed line box o11 is an example of the route overview information for the first route, and is text indicating "This is the first route. This route has the shortest traveling distance. This route passes through the Gaikan Expressway, the Kan-Etsu Expressway, the Ken-O Expressway, and the Chuo Expressway. This route extends north from Nerima to Tsurumi, southwest from Tsurumi to Hachioji, west from Hachioji to Otsuki, and southwest from Otsuki to Lake Kawaguchi." An area indicated by a dashed line box o12 is an example of route overview information for a second route, and is text indicating "This is the second route. This route is the cheapest. The route passes through Beltway 8, Koshu Kaido, and Fuji Michi. This route extends south from Wako to Shinjuku, west from Shinjuku to Otsuki, and southwest from Otsuki to Lake Kawaguchi."

When the learning level is Lv3, relative properties, road type 2, road type 1, and traffic characteristics are used as the aspects, as described with reference to FIG. 7.

In the route overview information for the first route, "This route has the shortest traveling distance" is a relative property, "This route passes through the Gaikan Expressway, the Kan-Etsu Expressway, the Ken-O Expressway, and the Chuo expressway" is road type 2, and "This route extends north from Nerima to Tsurumi, southwest from Tsurumi to Hachioji, west from Hachioji to Otsuki, and southwest from Otsuki to Lake Kawaguchi" is passage region 2, as indicated by a dashed line box k11. In the route overview information for the second route, "This route is the cheapest" is a relative property, "This route passes through beltway 8, Koshu Kaido, and Fuji Michi" is road type 2, and "This route extends south from Wako to Shinjuku, west from Shinjuku to Otsuki, and southwest from Otsuki to Lake Kawaguchi" is passage region 2, as indicated by a dashed line box k12.

In the example illustrated in FIG. 10, geographic properties are not included in the route overview information. Further, in the example illustrated in FIG. 11, traffic characteristics are not included in the route overview information. This is because the geographic properties or the traffic characteristics are not included in the route model or the geographic properties or the traffic characteristics are deleted due to limitations on the number of characters according to the setting of the filter. The deletion according to the number of characters may be performed by the natural language conversion unit 29.

When the route search has been performed, the route overview information illustrated in FIGS. 10 and 11 is notified of using voice before navigation starts, such as at the time of departure. When the notification unit 30 includes a display unit, the image of the map including the entire route as illustrated in FIG. 2 may be displayed.

Accordingly, the user can picture the overview of each route by listening to the overview of the first route or the second route illustrated in FIG. 10 or 11. The user selects the route for travel on the basis of the notified route overview information. The user utters a result of the selection through voice, and the input unit 12 acquires the selection result through voice recognition. Further, the user may input the selection result from the touch panel included in the notification unit 30.

<Process of Notifying of Overview of Route and Navigation Information>

Next, an example of a processing procedure of notifying of an overview of a plurality of routes and performing navigation for a route selected by a user from among notified routes will be described.

Figure 12:
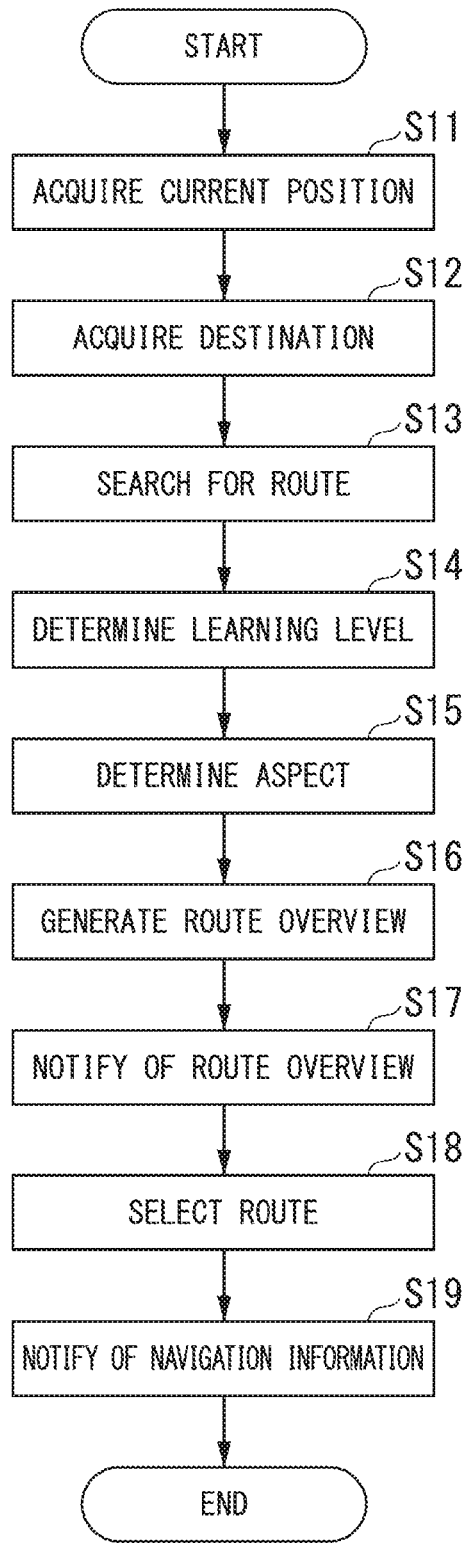
FIG. 12 a flowchart of a process of notifying of an overview of a plurality of routes and performing navigation for a route selected by a user from among notified routes according to this embodiment.

FIG. 12 is a flowchart of a process of notifying of an overview of a plurality of routes and performing navigation for a route selected by a user from among notified routes according to this embodiment.

(Step S11) The current position acquisition unit 10 acquires current position information indicating a current position.

(Step S12) The input unit 12 acquires a destination from an utterance of the user through voice recognition.

(Step S13) The route search unit 16 uses a known scheme to search for the route from the current position to the destination using the map information stored in the map DB 14. Subsequently, the route search unit 16 outputs route information indicating the route found through the search as a route model to the route overview generation unit 26 and the route selection unit 38.

(Step S14) The route description unit 27 determines a learning level of the route using the learning level at each point stored in the level storage unit 22.

(Step S15) Each aspect determination unit 27n of the route description unit 27 determines a description of each aspect for a specific route according to the route model. Subsequently, the route description unit 27 selects an aspect determination unit 27n to be used using the determined learning level. After the route description unit 27 selects the aspect determination unit 27n to be used, each aspect determination unit 27n may determine a description of each aspect for the specific route.

(Step S16) The addition unit 28 of the route description unit 27 combines the descriptions of the plurality of determined aspects to generate the entire route information. Subsequently, the natural language conversion unit 29 converts the entire route information output by the route description unit 27 into natural language by referring to the language model, and outputs the converted natural language as route overview information to the notification unit 30.

The process of steps S15 and S16 is performed on the plurality of routes found through the search.

After the process of steps S15 and S16 ends for the plurality of routes, the process proceeds to a process of step S17.

(Step S17) The notification unit 30 converts the route overview information output by the natural language conversion unit 29 into an audio signal, and outputs the converted audio signal.

(Step S18) After the notification unit 30 notifies of the route overview information for the plurality of routes, the notification unit 30 generates a voice signal to ask about a travel route (hereinafter referred to as a route selection question), and communicates using the generated voice signal. Subsequently, the route selection unit 38 selects the travel route on the basis of a voice signal acquired in response to the route selection question.

(Step S19) The navigation information generation unit 40 generates navigation information using information on the route output by the route selection unit 38 and the current position information output by the current position acquisition unit 10 using a known scheme until the vehicle arrives at the destination, and notifies of the generated navigation information from the notification unit 30.

Then, the process of notifying of the overview of the route and the navigation information ends.

While the example in which overview information on a plurality of routes is notified of has been described in the above-described example, the number of routes of which overview information is notified of may be one. For example, the user sets a condition for route search in advance. The route guide device 1 may search for a route satisfying the set condition, generate the overview of the entire route (entire route information or route overview information), and notify of the generated route overview information. In this case, after the process of step S17, step S18 is skipped and the process proceeds to step S19.

<Example of Method of Learning a Learning Level>

Next, an example of a processing procedure of learning the learning level will be described.

Figure 13:
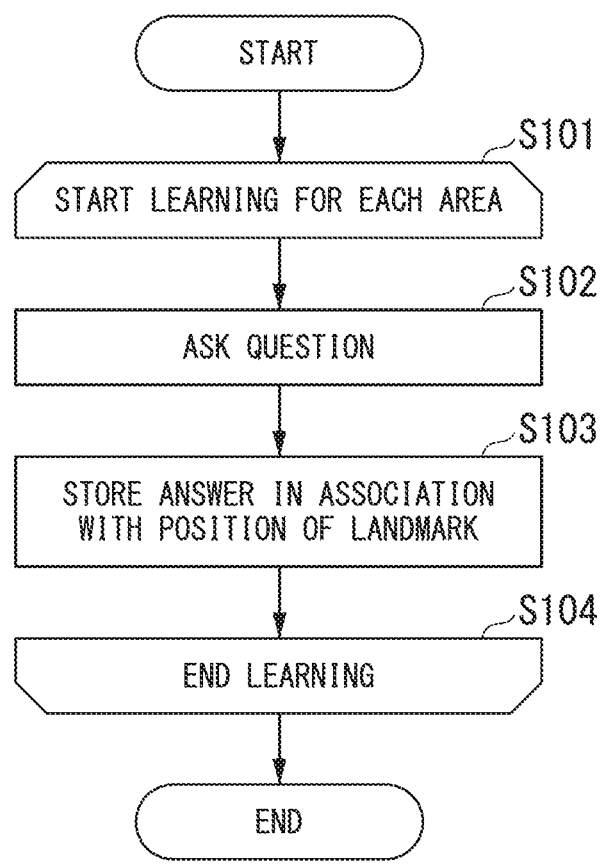
FIG. 13 is a flowchart of a process of learning the learning level according to this embodiment.

FIG. 13 is a flowchart of a process of learning the learning level according to this embodiment. The example illustrated in FIG. 13 is an example in which the route guide device 1 asks the user a question during travel, and learns the learning level according to the answer to the question.

(Step S101) The route guide device 1 performs a process of steps S102 to S103 during travel of the vehicle.

(Step S102) The level learning unit 34 generates a question using a keyword relating to a point at which the learning level is not determined, and outputs the generated question by voice from the notification unit 30. The keyword is a landmark, a road name, a commercial facility, or the like. The question relating to the point is, for example, "Have you ever gone to shopping center A in front of us?"

(Step S103) The level learning unit 34 acquires a response to the question of the user acquired by the input unit 12. Subsequently, when the acquired answer indicates that the user knows the keyword, the level learning unit 34 increases the learning level by, for example, 1. Subsequently, the level learning unit 34 stores, in the level storage unit 22, the learning level in association with information indicating the current position or a position of a facility or a road included in the keyword, and performs learning of the learning level.

(Step S104) The level learning unit 34 repeats the learning until the vehicle arrives at the destination, and ends the learning after the vehicle arrives at the destination.

While the example in which the user is asked questions by voice during travel and the learning level is learned according to the answers thereto has been described in the example illustrated in FIG. 13, the present invention is not limited thereto. For example, the level learning unit 34 may acquire the travel history of the vehicle on the basis of the current position information output by the current position acquisition unit 10, and store the acquired travel history in the level storage unit 22. In this case, the route description unit 27 may determine the learning level of the route on the basis of the travel history stored in the level storage unit 22. Further, travel dates and times are included in the travel history. Therefore, even if the user has traveled along the route a plurality of times in the past, if a predetermined time has passed since the travel history, the learning level may be lowered by 1 (for example, lowered from Lv4 to Lv3).

Further, the information included in the map DB 14 may be updated, for example, over a network (not illustrated). In this case, when re-development has been performed or a new facility has been built at a point for which the learning level has already been determined, the level learning unit 34 may ask the user a question by voice to update the learning level.

<Example When the Route is Short>

Next, an example when the route from the departure position to the destination is short will be described. The case in which the route is short is, for example, a route when a user goes shopping at a store within 30 minutes from her or his home.

Figure 14:
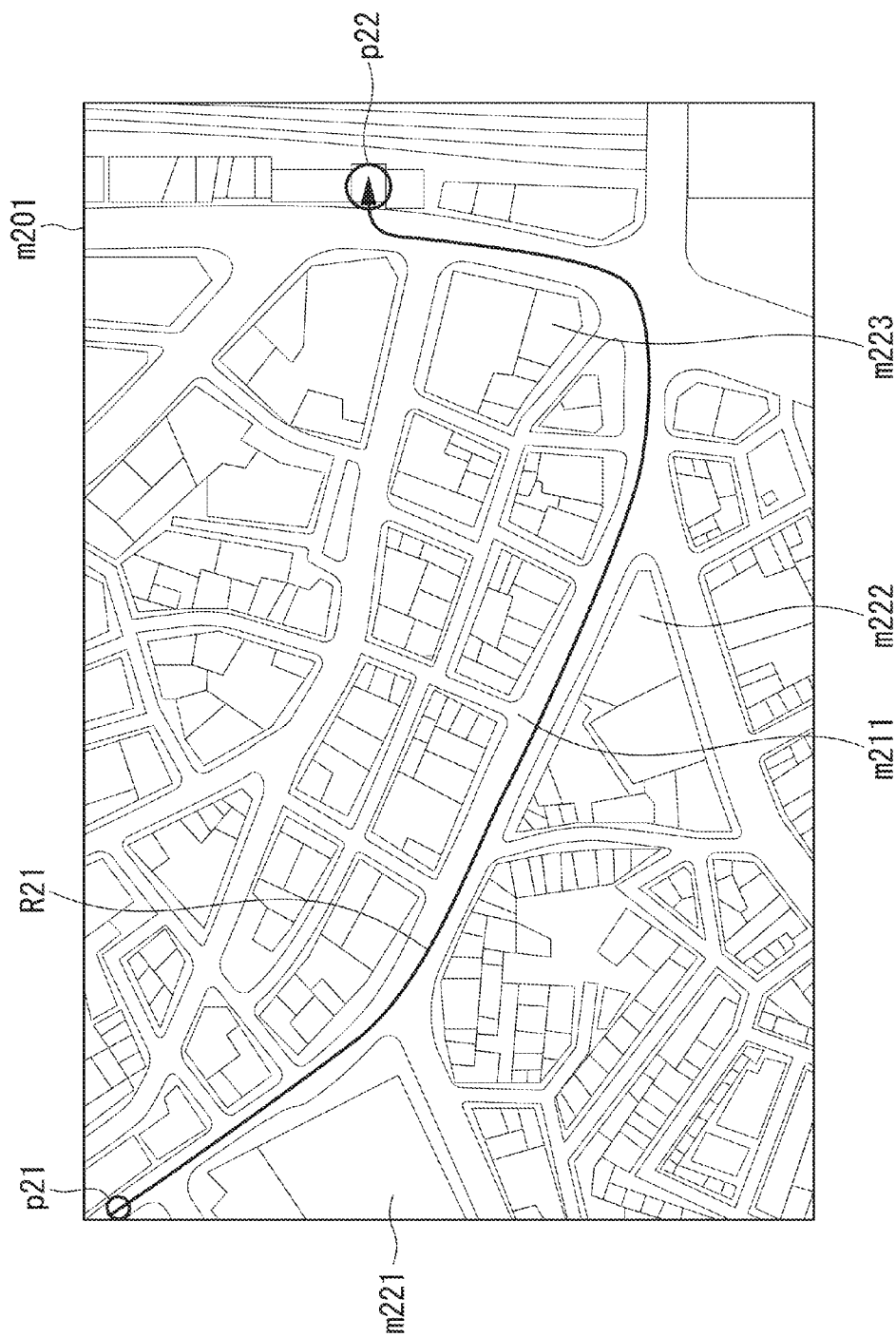
FIG. 14 is a diagram illustrating an example of a case in which the route is short according to this embodiment.

FIG. 14 is a diagram illustrating an example of a case in which the route is short according to this embodiment. In FIG. 14, a map m201 is an image of a map including a departure position p21 and a destination p22. A reference sign m211 indicates boulevard B, a reference sign m221 indicates a shopping center, a reference sign m222 indicates a bank, and a reference sign m223 indicates a convenience store. Further, a route from the departure position p11 to the destination p12 is a route R21.

When the route is short as above, providing more detailed information allows the user to easily understand the route, for example, unlike the entire route information for a long distance illustrated in FIG. 10. Therefore, in this embodiment, the setting of the filters included in the route description unit 27 is changed according a distance of the route, as described above. The setting of the filters includes, for example, prioritizing a large store located along the route, prioritizing an intersection name on the route, and prioritizing a station name when there is a station on the route.

In the route illustrated in FIG. 14, when the learning level is Lv1, the route overview information is, for example, "This is the first route. This route has the shortest traveling distance. The route passes through a boulevard." Further, when the learning level is Lv3, the route overview information is, for example, "This is the second route. This route has the shortest traveling distance. This route passes through boulevard B. The shopping center faces east and the convenience store faces north."

As described above, the route guide device 1 of this embodiment includes the current position acquisition unit 10 that acquires the current position, the input unit 12 that inputs the destination, the route search unit 16 that searches for the route from the current position to the destination, the level storage unit 22 that stores the user's learning level of the road information, the route overview generation unit 26 that generates the entire path information (entire route information route and route overview information) for all routes on the basis of the searched route and the learning level stored in the level storage unit, and the notification unit 30 that notifies of the entire route information generated by the route overview generation unit.

With this configuration, in this embodiment, the overview of the entire route from the departure position to the destination can be guided according to the user's learning level of the route. Accordingly, the user can picture the route to the destination by listening to a voice signal according to the learning level of the route on the basis of the overview of the entire route shown at the start of travel. Further, according to this embodiment, since the user can recognize the overview of the entire route through the voice signal without even looking at the image of the map or the like displayed on a display (not illustrated), it is possible to provide a route guide device that delineates the route using only voice.

Further, in the route guide device 1 of this embodiment, the notification unit 30 notifies of the entire route information (entire route information or route overview information) at the time of start of travel of the vehicle.

With this configuration, in this embodiment, before the route is searched for and the navigation starts, it is possible for the user to picture the route by listening to the voice signal according to the learning level of the route.

Further, in the route guide device 1 of this embodiment, the learning level is acquired on the basis of a travel history of the vehicle.

With this configuration, in this embodiment, since the learning level is determined on the basis of the travel history acquired in the background during travel of the vehicle, the overview of the entire route can be shown according to the user's latest learning level of the route.

Further, in the route guide device 1 of this embodiment, the entire route information (entire route information or route overview information) is generated using a matrix in which the information (for example, relative properties, geographic properties, road type 1, road type 2, passage region 1, passage region 2, passage region 3, passage region 4, and traffic characteristics) regarding a road included in the route is associated with each learning level (for example, FIG. 7).

Further, in the route guide device 1 of this embodiment, the information on the roads included in the route is at least one of information on characteristics of the route (for example, relative properties, geographic properties, and traffic characteristics), information on characteristics of roads in the route (for example, road type 1, road type 2, and traffic characteristics), information on a region through which the route passes (for example, passage region 1, passage region 2, passage region 3, and passage region 4), and information on a landmark along the route (for example, passage region 4).

Further, in the route guide device 1 of this embodiment, the route overview generation unit 26 extracts information from the information on characteristics of the route, the information on characteristics of the roads in the route, the information on the region through which the route passes, and the information on the landmark along the route according to the learning level.

With this configuration, in this embodiment, since the entire route information can be appropriately generated using the information on the roads included in the route according to the learning level, it is possible to show the entire route information at a learning level that will be easily understood by the user.

Further, in the route guide device 1 of this embodiment, the route overview generation unit 26 extracts information from the information on characteristics of the route, the information on the characteristics of the roads in the route, the information on the region through which the route passes, and the information on the landmark along the route according to a distance of the route.

With this configuration, in this embodiment, it is possible to provide an overview of the route according to the distance of the route. As a result, the user can recognize a width of the route based on the notified entire route information. Here, the width of the route is a width within an area that the user visits on a daily basis, a width of beyond the area that the user visits on a daily basis, or the like.

Further, the route guide device 1 of this embodiment further includes a route selection unit 38 that selects entire route information on one of a plurality of routes (for example, the first route and the second route) according to an instruction of the user. The route overview generation unit 26 generates the entire route information for the plurality of routes, the notification unit 30 notifies of the entire route information on the plurality of routes, and the route selection unit acquires a selection instruction indicating the entire route information selected by the user from among the entire route information on the plurality of routes notified of by the notification unit.

With this configuration, in this embodiment, even when a plurality of routes are presented, it is possible to assist the user in selecting a travel route based on the notified overviews of the entire routes.

At least one of the map DB 14, the route search unit 16, the configuration setting storage unit 18, the level storage unit 22, the language model 24, and the route overview generation unit 26, which are the components of the route guide device 1 shown in this embodiment, may be provided on a cloud. in this case, the current position acquisition unit 10 and the input unit 12 may transmit the current position information and the destination information to the components included in the cloud, and acquire and notify of the entire route information generated by the component of the cloud. Further, only the map DB 14 may be arranged in the cloud.

Further, in this embodiment, the example in which the route guide device 1 is a car navigation device has been described, but the present invention is not limited thereto. For example, when the route guide device 1 is a smart phone, the route may be a route along which a user walks. Even while the user is walking, the user can recognize an overview of a movement route before walking. Further, a user unfamiliar with a map easily recognizes an image of the route by referring to the overview of the route before departing.

Further, when the route guide device 1 is a smart phone and an earphone with a microphone is connected to the route guide device 1, the user may instruct input of the destination or start of route search by voice. Accordingly, the user can provide instructions on searching for the route using only voice and recognize the overview of the route prior to departure even when the user is outside and cannot easily read a liquid crystal screen.

Further, the route guide may be performed by voice by recording a program for realizing the functions of the route guide device 1 of the present invention on a computer-readable recording medium, loading the program recorded on the recording medium into a computer system, and executing the program. Here, the "computer system" includes an OS or hardware such as a peripheral device. Further, the "computer system" is assumed to include a WWW system including a homepage providing environment (or display environment). Further, the "computer-readable recording medium" refers to a portable medium such as a flexible disk, a magneto-optical disc, a ROM, or a CD-ROM, or a storage device such as a hard disk embedded in the computer system.

Further, the "computer-readable recording medium" also includes a recording medium that holds a program for a certain period of time, such as a volatile memory (RAM) inside a computer system including a server or a client when the program is transmitted over a network such as the Internet or a communication line such as a telephone line.

Further, the above program may be transmitted from a computer system in which the program is stored in a storage device or the like to other computer systems via a transmission medium or by transmission waves in the transmission medium. Here, the "transmission medium" for transmitting the program refers to a medium having a function of transmitting information, such as a network (communication network) such as the Internet or a communication line such as a telephone line. Further, the above program may be a program for realizing some of the above-described functions. Alternatively, the program may be a program capable of realizing the above-described functions in combination with a program previously recorded in a computer system, i.e., a differential file (a differential program).

What is claimed is:

1. A route guide device comprising:
   a current position acquisition unit configured to acquire a current position of the route guide device;
   an input unit configured to input a destination of a user;
   a route search unit configured to search for a route from the current position to the destination;
   a level storage unit configured to store a learning level indicative of how familiar the user is with a road;
   a route overview generation unit configured to generate entire route information indicating an overview of entire information of the route found by the route search unit based on the learning level stored in the level storage unit; and
   a notification unit configured to notify the user of the entire route information generated by the route overview generation unit,
   wherein the route overview generation unit is configured to:
      determine an aspect according to the learning level with respect to the route from a matrix which is stored in advance and indicates a predetermined number of sets of aspects associated with the learning level,
      generate the entire route information from a description of the determined aspect, and
   wherein, in the matrix,
      the learning level with which a set including a first passage region and a traffic characteristics is associated is higher than the learning level with which a set not including the first passage region and the traffic characteristics is associated, among sets including a geographic property and a first road type as the aspect,
      the learning level with which a set including a second road type, a second passage region and a third passage region instead of the geographic property, the first road type and the first passage region is associated is higher than the learning level with which a set including the geographic property, the first road type and the first passage region is associated, among sets including the traffic characteristics as the aspect, and
      the learning level with which a set including a fourth passage region instead of the traffic characteristics is associated is higher than the learning level with which a set including the traffic characteristics is associated, among sets including the second road type, the second passage region and the third passage region as the aspect,
      the geographic property being a description of geographic property of a road included in the route,
      the traffic characteristics being a description of ease of driving included in the route,
      the first road type being a description of a type of a road included in the route,
      the second road type being a description of a road name included in the route,
      the first passage region being a name of a prefecture included in the route,
      the second passage region being a city name or a ward name included in the route,
      the third passage region being a landmark name included in the route, and
      the fourth passage region being a street name, a town name or a village name included in the route.

2. The route guide device according to claim 1, wherein the notification unit notifies of the entire route information when a vehicle starts traveling.

3. The route guide device according to claim 1,
   wherein the learning level is acquired based on a travel history of a vehicle.

4. The route guide device according to claim 1, further comprising a route selection unit configured to select the entire route information on one of a plurality of routes according to an instruction of the user,
   wherein the route overview generation unit generates the entire route information on the plurality of routes,
   the notification unit notifies of the entire route information on the plurality of routes, and
   the route selection unit acquires a selection instruction indicating the entire route information selected by the user from among the entire route information on the plurality of routes notified of by the notification unit.

5. The route guide device according to claim 1, wherein the learning level is input by the user.

6. A route guide method comprising:
   acquiring, via a current position acquisition unit, a current position of a route guide device;

inputting, via an input unit, a destination of a user;
searching, via a route search unit, for a route from the current position to the destination;
storing, via a level storage unit, a learning level indicative of how familiar the user is with a road;
generating, via a route overview generation unit, entire route information indicating an overview of entire information based on the learning level; and
notifying, via a notification unit, the user of the entire route information,
wherein generating the entire route information includes
determining an aspect according to the learning level with respect to the route from a matrix which is stored in advance and indicates a predetermined number of sets of aspects associated with the learning level,
generating the entire route information from a description of the determined aspect, and
wherein, in the matrix,
the learning level with which a set including a first passage region and a traffic characteristics is associated is higher than the learning level with which a set not including the first passage region and the traffic characteristics is associated, among sets including a geographic property and a first road type as the aspect,
the learning level with which a set including a second road type, a second passage region and a third passage region instead of the geographic property, the first road type and the first passage region is associated is higher than the learning level with which a set including the geographic property, the first road type and the first passage region is associated, among sets including the traffic characteristics as the aspect, and
the learning level with which a set including a fourth passage region instead of the traffic characteristics is associated is higher than the learning level with which a set including the traffic characteristics is associated, among sets including the second road type, the second passage region and the third passage region as the aspect,
the geographic property being a description of geographic property of a road included in the route,
the traffic characteristics being a description of ease of driving included in the route,
the first road type being a description of a type of a road included in the route,
the second road type being a description of a road name included in the route,
the first passage region being a name of a prefecture included in the route,
the second passage region being a city name or a ward name included in the route,
the third passage region being a landmark name included in the route, and
the fourth passage region being a street name, a town name or a village name included in the route.

* * * * *